Dec. 7, 1965  D. L. KLASS ETAL  3,221,849
ELECTRIC-FIELD-RESPONSIVE FLUID DEVICE
Filed June 30, 1961  4 Sheets-Sheet 2

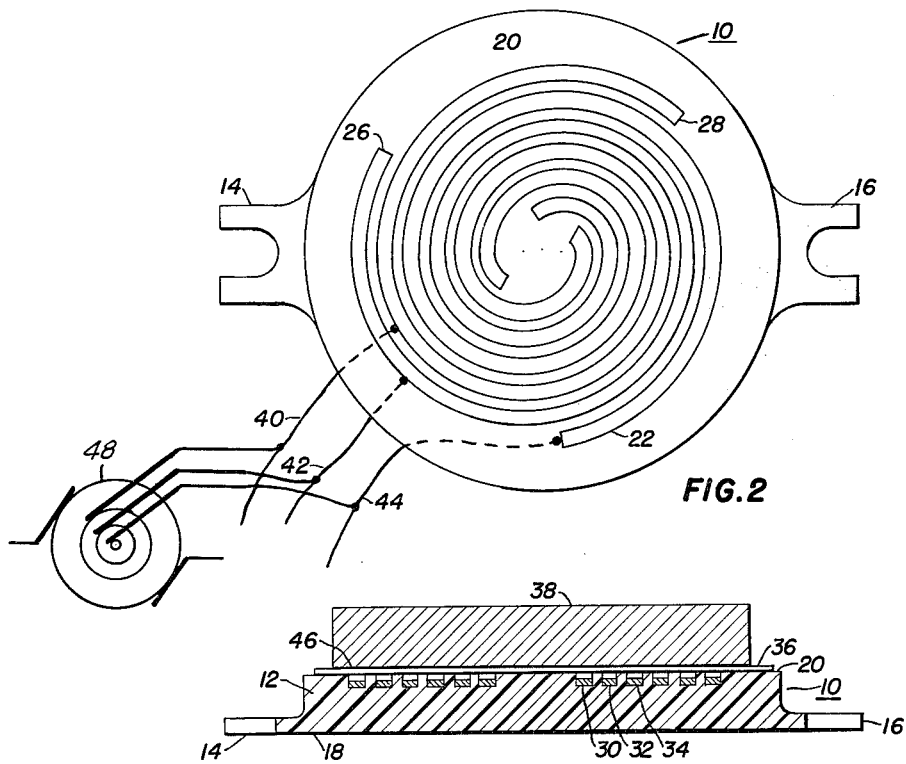
FIG.2
FIG.1
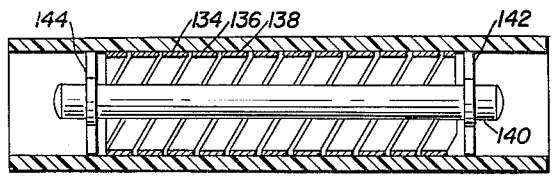
FIG. 8
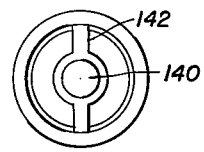
FIG.9

INVENTORS
DONALD L. KLASS
VINCENT BROZOWSKI
BY
Edward H. Lang
ATTORNEY

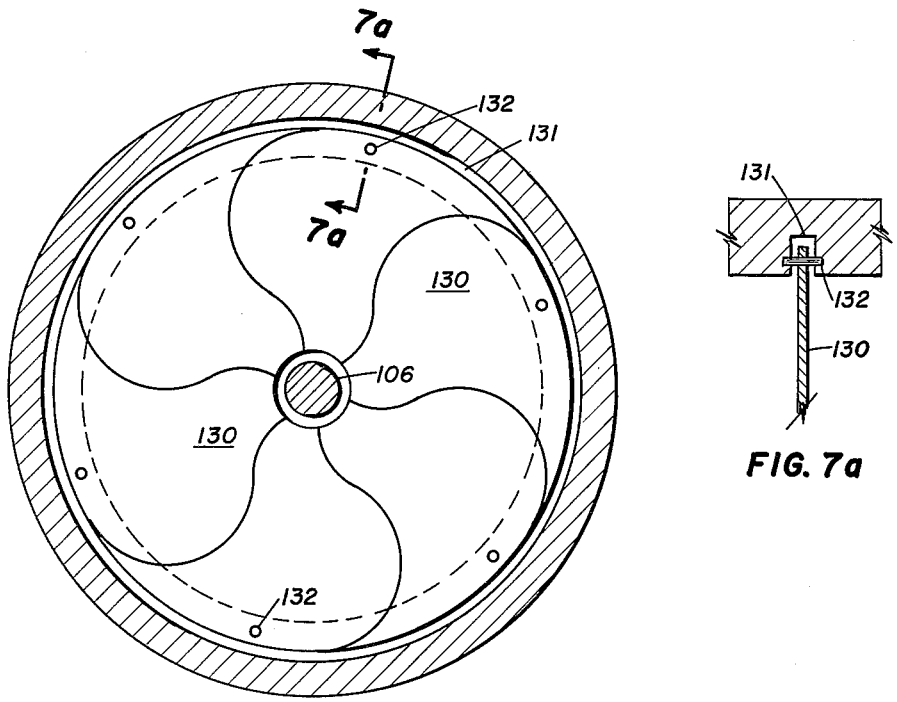

United States Patent Office 3,221,849
Patented Dec. 7, 1965

3,221,849
ELECTRIC-FIELD-RESPONSIVE FLUID DEVICE
Donald L. Klass, Barrington, and Vincent Brozowski, Mundelein, Ill., assignors to Union Oil Company of California, Los Angeles, Calif., a corporation of California
Filed June 30, 1961, Ser. No. 121,091
10 Claims. (Cl. 192—21.5)

This invention is directed to a coupling device, which may be used in conjunction with an electric-field-responsive fluid, for impeding the relative movement of said fluid and fluid-confining elements, or relative movement between two elements separated by said fluid.

It is known that certain fluids respond to the presence of alternating electric fields by manifesting a dramatic and reversible change in apparent viscosity. It is further known that certain electric-field-responsive fluids exhibit an apparent change in bulk viscosity under the influence of an alternating electric field, where the field is applied directly across the fluid film, the fluid being in contact with electrodes placed on opposite sides of the film, so that the field extends transversely through the film. Devices embodying this principle are taught, for example, by the patents to Winslow, 2,661,596 and 2,661,825. It is further known that if a film of the aforesaid fluid is disposed on a thin dielectric surface, an alternating electric field is applied to the film from beneath said surface, and a conductive object is placed on or in the fluid film, the fluid film, when energized by the electric field, will secure the object firmly in place.

It has now been found that a conductive object may be secured against lateral movement with respect to a plurality of spaced electrodes having surfaces adjacent to a conductive surface of the object to be secured. This finding is in contradistinction to the prior art knowledge that relative movement is impeded only when the electric potential is imposed between the object to be secured and the surface to which it is to be secured, or where a dielectric shield is imposed between a number of electrodes and the object to be secured.

It is an object of this invention to provide an electric-field-responsive fluid coupling device in which the necessity for applying electric potential across the coupled members is eliminated. Another object of this invention is to provide a fluid coupling device in which electric potential is applied between spaced electrodes disposed in one coupling member, and in which no dielectric shield is disposed between the coupled members. Still another object of this invention is to provide a fluid coupling device of improved holding power. Still another object of this invention is to provide a fluid coupling device of compact design adapted to transmit higher torques than has heretofore been possible.

The invention is best described with reference to the drawing, of which:

FIGURE 1 is an elevational view, in section, of a chucking device fabricated in accordance with this invention.

FIGURE 2 is a plan view of the chucking device of FIGURE 1.

FIGURE 7 is a view of a variable-area clutching plate which may be employed in the coupling of FIGURE 6.

FIGURE 7a is a fragmentary cross-sectional view taken along the lines 7a—7a of FIGURE 7.

FIGURE 8 is a plan view, in section, of an electric-field-responsive valve for controlling the flow of an electric-field-responsive fluid.

FIGURE 9 is an end view of the valve of FIGURE 8.

Figure 3:
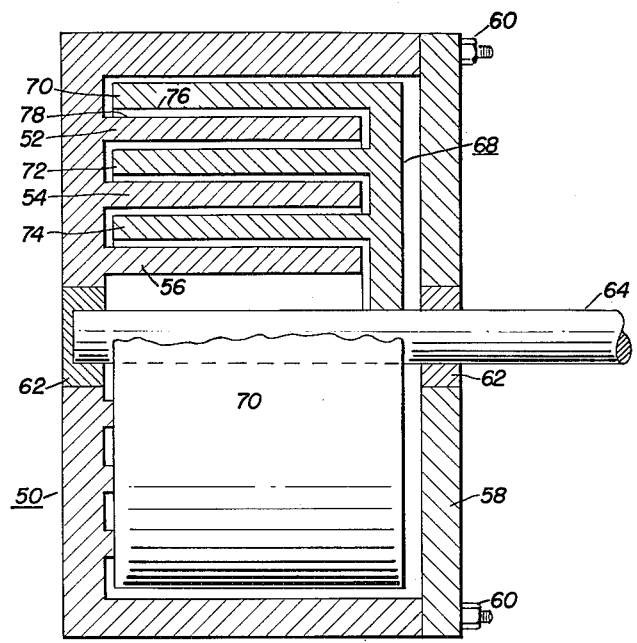
FIGURE 3 is a plan view, partially in section, of an electric-field-responsive fluid coupling fabricated in accordance with this invention.

Referring to FIGURES 1 and 2, chucking device 10 comprises a disc-shaped base 12, which is fabricated of an electrically insulating material, such as a thermo-plastic or thermo-setting resin. The base 12 is provided with ears 14 and 16, by means of which it may be securely mounted to a machine bed by means of bolts. The base has a flat lower surface 18 and a flat upper surface 20, the upper surface being provided with a plurality of grooves of rectangular cross-section, such as grooves 22, 26 and 28. The grooves may be spiral as shown, or annular, or radial. In each groove is set an electrode, such as electrodes 30, 32, and 34. The grooves are slightly deeper than the height of the electrodes, so that the flat upper electrode surfaces lie in a plane below the surface 20 of base 12. The distance between the upper surfaces of the electrodes and the surface 20 is on the order of 0.0005 to 0.50 inch. A layer of transient-electric-field-sensitive fluid 36 is disposed across the upper surface 20 of the chuck, and a conductive object 38 is floated in the fluid film. Three electrical conductors, 40, 42, and 44, connect to the three electrodes 30, 32, and 34. The grooves 22, 26, and 28 may be made quite shallow, and the electrodes may be fabricated from a foil of a conductive metal which is pressed into the grooves. Alternatively, the electrodes may be produced by conventional printed-circuit techniques. It is necessary, however, that the upper surface of the electrodes be spaced below the surface 20 of the base 12 to prevent the possibility of short circuit between the electrodes by contact with the conductive object 38. The conductive object 38 may be merely a block of steel which is to be held in place, or it may be a block of nonconductive material which is flash-coated to provide a conductive lower layer 46 which contacts the fluid film 36.

In either case, when the wires leading from the electrodes are connected to an electric-potential source to energize the chuck, the fluid film is rendered viscous and the object 38 is secured firmly in place. Moreover, the force securing the chuck is greater than that provided by prior art devices in which a layer of dielectric material, such as barium titanate, is disposed between the electrodes and the fluid film. The electrodes may be of any number greater than two, but preferably are three or more in number. The use of three or more electrodes permits connection of the device to a three-phase-potential source 48, with the result that higher holding forces can be obtained at equivalent input potentials using the same electric-field-responsive fluid.

Figure 4:
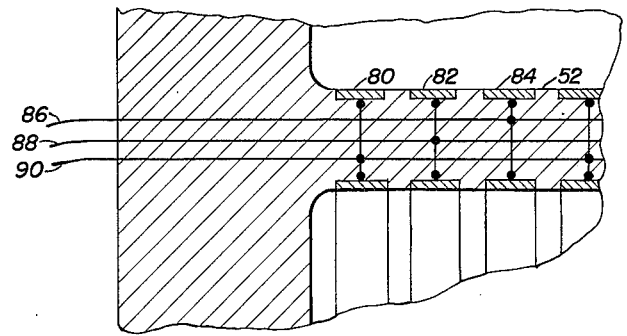
FIGURE 4 is an enlarged view of a portion of one of the annular clutching members of the coupling of FIGURE 3.
Figure 5:
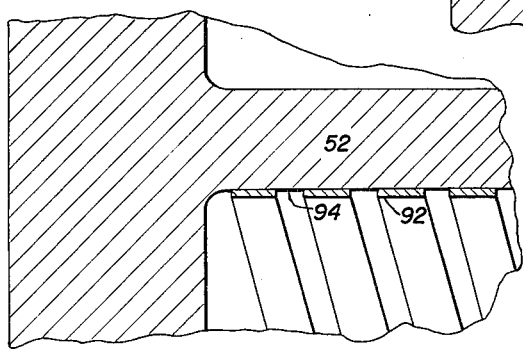
FIGURE 5 is a view of a portion of one of the annular clutching members of the coupling of FIGURE 3, showing an alternate electrode pattern.

Referring to FIGURES 3, 4, and 5, a fluid coupling, which may be used as a clutch or brake device, is shown. The coupling comprises a circular housing 50 equipped with a plurality of annular spaced rings, such as rings 52, 54, and 56. The housing is enclosed by means of cover plate 58, which is secured to the housing by means of bolts 60. The housing and cover plate are each provided with a bearing 62, which supports shaft 64. Shaft 64 in turn supports rotor 68 which is provided with a plurality of annular rings 70, 72, and 74. These latter annular rings are spaced between the annular rings 52, 54, and 56. The housing rings and rotor rings are coaxially disposed with respect to each other and spaced so that the distance between adjacent surfaces of the rings, such as surfaces 76 and 78, is in the range of 0.0005 to 0.5 inch. Each annular ring secured to the housing 50 is provided with a plurality of electrodes extending around both the internal and external surfaces of the ring. Referring to FIGURE 4, which is an expanded fragmentary view of the annular ring 52 of FIGURE 3, it is seen that the interior and exterior surfaces of the ring are provided with a plurality of grooves in which are disposed a plurality of electrodes, 80, 82, 84, and so forth, across the faces of the ring. Three electrical conductors, 86, 88, and 90, are provided to make electrical connection with the electrodes, 80, 82, and 84. In this case, three sets of electrodes are provided, the total number of electrodes being some multiple of three, such as twelve, so that there will be four electrodes in each set. One conductor, such as conductor 86, is electrically connected to each electrode in one set. In FIGURE 4, the electrodes are rings which extend around the interior faces of the annular ring 52. In FIGURE 5, a similar arrangement is shown, except that the electrodes are disposed in a spiral relationship with respect to the annular ring 52, and only three electrodes are provided. This arrangement has an advantage in that the entire surface of the annular ring 52 can be provided with spaced electrodes by using only three spiral electrodes, each electrode extending around the cylindrical surface of annular ring 52 a plurality of times. Each electrode has one end terminating adjacent to the housing 52, and electrical connection can be made to this end, thereby simplifying the network of electrical conductors which must be employed. It is evident that the electrodes need not be disposed in grooves cut in the surface of the annular rings, but may merely be placed on the flat internal or external surface of the ring as shown in FIGURE 5, and extend inwardly or outwardly from the surface. Thus the electrode 92 of FIGURE 5 extends inwardly from the internal surface 94 of annular ring 52. The electrodes are preferably formed by conventional printed-circuit techniques, and applied to annular rings which are preferably fabricated of an electrically insulating material, such as one of the numerous electrically insulating moldable plastics. The housing 50 and cover plate 58 may be fabricated of either plastic or metal. The rotor 68 may be fabricated of plastic or metal, but the surfaces of the annular rings 70, 72, and 74, which lie adjacent to the mating surfaces of annular rings 52, 54, and 56, must be conductive. If the annular rings 70, 72, and 74 are to be fabricated of plastic, it will be necessary to flash coat the surfaces with a film of conductive metal. Alternatively, the whole rotor assembly and shaft may be fabricated of metal.

It is evident that in the coupling of this invention an advantage is obtained in that electrical potential is applied only to electrodes in one member of the coupling, that is, either the housing or the rotor. In prior art coupling devices it was essential that electrical potentials be applied across the housing and rotor, or across two rotors, thus necessitating the making of electrical connection to the rotating body. In the apparatus of this invention, no electrical connection need be made to the shaft 64 or rotor 68. Where the device is to be used as a brake, the necessity for slip rings is therefore avoided altogether. It will be evident that while the corresponding surfaces 76 and 78, which are the clutching surfaces bounding the annular rings 52 and 70, are described as being cylindrical, they need not necessarily be cylindrical. All that is required is that the adjacent surfaces be corresponding surfaces of revolution. A surface of revolution is a surface generated by rotating a line about an axis. Thus, where the line is a straight line, the surface of revolution generated will be a cylinder, a cone, or the surface of a disc, depending on whether the line which is rotated to generate the surface lies parallel with, at some angle to, or perpendicular to the axis about which it is rotated.

Figure 6:
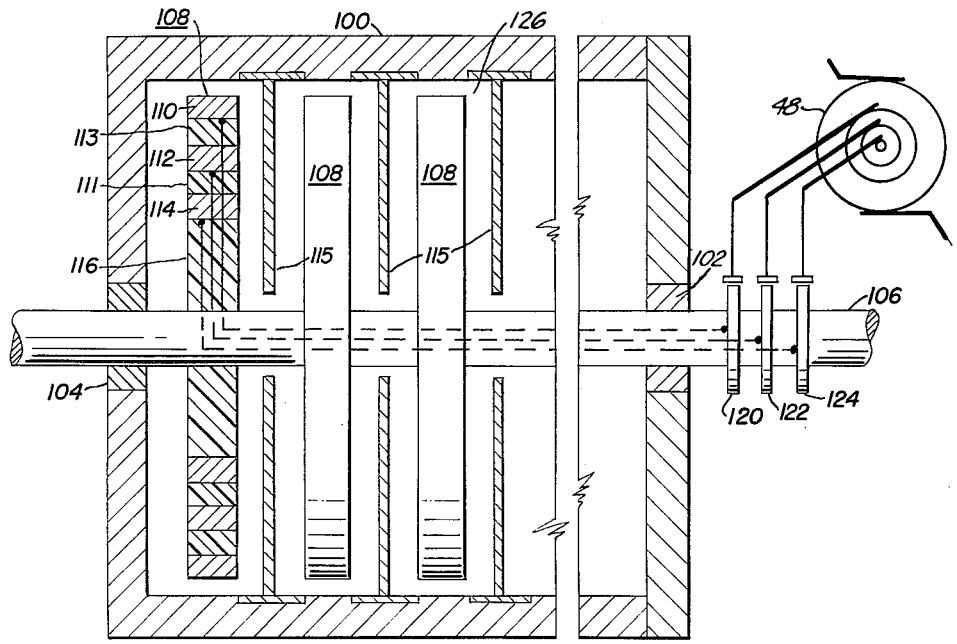
FIGURE 6 is a plan view, partially in section, showing an alternate coupling assembly.

Referring to FIGURE 6, housing 100 supports bearings 102 and 104, through which rotates shaft 106. Shaft 106 supports a plurality of disc-shaped clutch members 108 which are secured to shaft 106 for rotation therewith. Each disc-shaped clutch member comprises three electrode rings 110, 112, and 114, which are separated by electrically insulating rings 111 and 113, the smallest electrode ring 114, being supported by insulating disc 116. The rings and insulating discs together form the double-faced clutch members 108. The electrode rings extend axially through the disc-shaped clutch members and form a portion of the flat right-hand and left-hand surfaces of each member. Spaced between the disc-shaped clutch members 108 are washer-shaped clutch members 115, which are supported from housing 100. Each of the washer-shaped clutch members 115 is either fabricated of an electrically conductive material, such as steel, or at least plated with an electrically conducting material on the surfaces adjacent to the clutch members 108. The adjacent surfaces of the washer-shaped clutch members and the disc-shaped clutch members are preferably spaced from each other at a distance in the range of 0.0005 to 0.5 inch. Three slip rings 120, 122, and 124, are supported by shaft 106 for rotation therewith. The slip rings are electrically insulated from the shaft, and are connected, by means of wires extending through the shaft, to the electrodes 110, 112, and 114, so that the electrodes can be energized by three-phase potential source 48. The operation of the device is similar to the operation of the coupling depicted in FIGURE 3, and the chuck depicted in FIGURE 1, in that when electric potential is applied to the electrodes, the electric-field responsive fluid 126 disposed adjacent to the electrodes becomes extremely viscous and tends to impede relative movement of the electrodes with respect to the adjacent conducting surface. In FIGURE 7, a modified ring-shaped clutching member is depicted. This member is fabricated from a plurality of segments 130, each segment being relatively thin and supported slidably with respect to the other segments. The outer edge of the segments 30 is recessed in an annular groove 131 of housing 100. Each segment pivots on a pin 132 fastened to the segment adjacent to its outer edge. The ends of the pins are held in recesses in the walls of the annular groove and are adapted to rotate in electrical contact with the housing 100. The mechanism of operation of the segments, which can be identical to that conventionally employed in the iris of a camera, is such that the size of the opening in the washer-shaped member may be varied at will. Such a washer-shaped clutch member may be substituted for the clutch members 115 of FIGURE 6, whereby the effective area of clutching surface between the disc-shaped members 108 and the washer-shaped members 115 may be adjusted to any desired value. Such a modification is especially desirable where the coupling will operate for extended periods of time at high rates of slip. For example, it may be desired to employ the coupling as a brake, and to rotate the shaft 106 at high rates of speed for long periods of time without applying braking force thereto. During such intervals of operation, the variable-area washer-shaped clutch member of FIGURE 7 may be open to provide minimum overlap with respect to the disc-shaped clutch members. Thus, heat build-up caused by the residual viscosity of the electric-field-responsive fluid will be minimized, and the rate of deterioration of the fluid, which is sensitive to heat, will be reduced.

Referring to FIGURES 8 and 9, an electric-field-responsive fluid valve device of novel construction is shown. The valve comprises a tube fabricated of electrically insulating material, such as polyethylene. Within the tube and supported therefrom are three spiral-shaped electrodes which extend around the tube interior and laterally over the effective valving area of the tube. The three electrodes, 134, 136, and 138, are spaced from each other and supported by the tube in electrically insulated relationship. An electrically conducting rod 140, which may be made of steel, is supported within the tube by support posts 142 and 144. Electrical connection between the three electrodes and a three-phase power source is made to energize the valve. Each electrode has a substantially flat interior surface which rests in contact with fluid passing through the valve. The spacing between the exterior surface of rod 140 and the interior surface of the electrodes may be any convenient value, preferably not in excess of about one-quarter inch. Upon the application of electric potential to the electrodes, the fluid disposed between the electrodes and the rod stiffens and becomes substantially immobile. By the application of electric potentials of lesser magnitudes, the viscosity of the fluids can be increased in proportion to the magnitude of the applied potential, and the flow of fluid through the valve is thereby throttled.

It will be understood that with respect to all of the devices of the various figures of this specification, the magnitude of change in viscosity in the electric-field-responsive fluid will be proportional to the electrode area to which the fluid is exposed and to the potential applied to the electrodes. In each embodiment, any number of electrodes not less than two may be used. In most instances it is advantageous to employ at least three electrodes, as is shown in the figures, to permit the use of three-phase potential and the resulting greater change in fluid viscosity for a given applied potential. It is evident that numerous configurations using different numbers of electrodes are possible.

Suitable high-resistivity materials which may be used to support the electrode in proper spaced relationship include epoxy resins, urea-formaldehyde resins, polyethylene resins, etc. Electric potentials applied to the electrodes may vary from small voltages to several thousand volts, but care should be taken so that the applied voltage does not exceed the dielectric strength of the fluid layer. This strength will be dependent upon the spacing between the electrodes and the adjacent conducting surface. The potential must in each case be a transient electric potential. By this is meant a potential of changing magnitude, i.e., voltage. Thus, as the term is used in this specification, transient electric potentals include varying potentials of positive voltage as well as alternating potentials. For reasons of convenience, it is preferred to employ alternating potentials, and especially three-phase potential.

As an example of use of the apparatus of this invention, an electric-field-responsive fluid chucking device having three electrodes, each with a surface area of about one-quarter inch and spaced from each other at a distance of one-quarter inch, with the surfaces of the electrodes recessed below the surface of the body of the chuck a distance of 0.001 inch, was connected to a three-phase power source. The upper surface of the chuck and electrodes were coated with a fluid formulated as follows:

|  | Percent W. |
|---|---|
| Refined lube oil | 30.5 |
| Silica | 50.0 |
| Glycerol monooleate | 5.5 |
| Ethylene glycol | 4.0 |
| 1-hydroxyethyl, 2-heptadecyl imidazoline | 10.0 |

A stainless steel test body was placed in the fluid film and passed down into the film, so that the space between the electrodes and the test body occupied by the fluid film was about 0.001 inch. The chuck was energized by a three-phase potential of 1,000 volts, and the force required to move the test body with respect to the electrodes was measured as 13 ounces per square inch of surface area. The test was repeated employing a second chuck fabricated in accordance with the prior art methods, the second chuck differing from that of the first test in that a 0.020 inch layer of barium-titanate-pigmented epoxy ceramic was placed on top of the electrodes, in contact therewith. The layer of fluid film was placed on top of the barium-titanate layer, and the same stainless steel test block forced down into the fluid film until a film thickness of 0.001 inch existed between the ceramic layer and the test block. A three-phase potential of 1,000 volts was then applied to the electrodes, and the force required to move the stainless steel test block was measured as 5 ounces per square inch of surface area. It is evident that by the elimination of the ceramic layer the holding strength of the device was greatly increased.

The embodiments of the invention in which an exclusive property or privilege is claimed are defined as follows:

1. A transient-electric-field-responsive coupling comprising a plurality of laterally spaced conductive metal electrodes, each having an exposed surface, said electrodes being shaped and disposed so that said exposed surfaces lie in a common surface of revolution, means for supporting said electrodes in electrically insulated relationship, and a member supported rotatively with respect to said electrodes and electrode support means and coaxially with respect to said surface of revolution, said second member having an electrically conductive surface of revolution generally corresponding to said first-mentioned surface of revolution and spaced therefrom a distance of about 0.0005 to 0.50 inch a thin lay of fluid, which exhibits an apparent change in bulk viscosity under the influence of an alternating electric field, disposed between and in contact with said electrodes and the conductive surface of said second member, and means for applying transient electric potential to said electrodes.

2. A coupling in accordance with claim 1 in which said surfaces of revolution are cylindrical.

3. A coupling, in accordance with claim 1 in which said electrodes are at least three in number.

4. A coupling in accordance with claim 3 in which said electrodes form spirals extending around said first-mentioned surface of revolution.

5. A transient-electric-potential-responsive coupling comprising a disc-shaped member including a plurality of spaced conductive metal electrodes and means for rotatably supporting said electrodes in electrically insulated relationship, said electrodes each having a flat surface lying in a face of said member, a washer-shaped member supported in coaxial relationship to said first member and spaced therefrom, said washer-shaped member being formed of electrically conductive leaf-like segments adapted for slidable movement relative to each other to vary the surface area of said member, and means for confining a fluid exhibiting an apparent change in bulk viscosity under the influence of an alternating electric field between and in contact with said members.

6. An apparatus in accordance with claim 5 including means for applying transient electric potential to said electrodes.

7. An apparatus in accordance with claim 5 in which said electrodes are at least three in number.

8. A transient-electric-potential-responsive coupling comprising coaxial relatively rotatable members arranged to provide opposed surfaces spaced from each other a distance of about 0.0005 to 0.50 inch, one of said members supporting a plurality of metal electrodes in electrically insulated relationship, each of said electrodes having a bare exposed surface facing said second member, the surface of said second member facing said electrodes being electrically conductive, a thin layer of fluid, which exhibits an apparent change in bulk viscosity under the influence of an alternating electric field, disposed between said members, and means for applying transient electric potential to said electrodes.

9. A transient-electric-field responsive device comprising a plurality of spaced conductive metal electrodes insulated from each other, each of said electrodes having a bare surface, a conductive member, means for supporting said member in a manner such that said member and said electrodes are movable relative to each other, said member being in juxtaposition to the bare surfaces of said electrodes but spaced therefrom, a thin layer of a fluid, which exhibits an apparent change in bulk viscosity under the influence of an alternating electric field, between said electrode surfaces and conductive member and in contact therewith, said electrodes being connected to different poles of a transient electric potential source.

10. A transient-electric-potential-responsive coupling comprising a housing, a set of electrically conductive washer-shaped clutch members rigidly supported in coaxially aligned spaced relationship within said housing, shaft means rotatively supported by said housing and extending coaxially through openings in said washer-shaped clutch members, a set of disc-shaped clutch plates supported on said shaft for rotation therewith, said clutch plates being located between said clutch members and spaced therefrom, said clutch plates comprising a plurality of conductive electrodes each having a bare exposed surface disposed so that said bare exposed surfaces form a portion of the clutching surface of each plate, with at least two bare exposed electrode surfaces in each such clutching surface, said electrodes being radially spaced and insulated from each other, a fluid, which exhibits apparent change in bulk viscosity under the influence of an alternating electric field, between said members and at plates and in contact therewith, said electrodes being connected to opposite poles of a transient-electric-potential source.

References Cited by the Examiner
UNITED STATES PATENTS

| | | | |
|---|---|---|---|
| 2,568,824 | 9/1951 | Rahbek | 317—144 |
| 2,663,809 | 9/1951 | Winslow | 317—144 |
| 2,897,424 | 7/1959 | Waring. | |
| 3,150,678 | 9/1964 | Nuber | 192—21.5 X |

FOREIGN PATENTS

| | | |
|---|---|---|
| 1,163,513 | 4/1958 | France. |
| 830,101 | 3/1960. | Great Britain. |

OTHER REFERENCES

Dielectric and Semi-Conductive Suspensions, Tele-Tech, September 1962, pages 57, 135, 136, 138, 140 and 142.

DAVID J. WILLIAMOWSKY, *Primary Examiner.*